United States Patent [19]

Dancy, Jr.

[11] 3,955,753

[45] May 11, 1976

[54] GAS CENTRIFUGE WITH DRIVING MOTOR

[75] Inventor: William H. Dancy, Jr., Charlottesville, Va.

[73] Assignee: The United States of America as represented by the United States Energy Research and Development Administration, Washington, D.C.

[22] Filed: Apr. 13, 1961

[21] Appl. No.: 102,898

[52] U.S. Cl. ................................. 233/1 C; 233/16; 233/27; 233/DIG. 1
[51] Int. Cl.² ........................................ B01D 21/26
[58] Field of Search .................. 233/24, 27, 28, 32, 233/33, 16, DIG. 1; 310/166

[56] References Cited
UNITED STATES PATENTS

| | | | |
|---|---|---|---|
| 2,653,257 | 9/1953 | Sailer ................................. | 310/166 |
| 3,025,708 | 3/1962 | Slater et al............................ | 74/5.4 |

FOREIGN PATENTS OR APPLICATIONS

| | | | |
|---|---|---|---|
| 259,133 | 10/1926 | United Kingdom................... | 233/24 |
| 525,070 | 5/1956 | Canada................................. | 233/27 |
| 1,080,931 | 4/1960 | Germany.............................. | 233/24 |
| 852,392 | 10/1960 | United Kingdom................... | 233/24 |
| 1,224,098 | 2/1960 | France................................. | 233/24 |

*Primary Examiner*—Stephen J. Lechert, Jr.
*Attorney, Agent, or Firm*—Dean E. Carlson

EXEMPLARY CLAIM

1. A centrifuge for separating gaseous constituents of different masses comprising a vertical tubular rotor, means for introducing a gas mixture of different masses into said rotor and means for removing at least one of the gas components from the rotor, a first bearing means supporting said rotor at one end for rotational movement, a support, a damping bearing mounted on said support, a shaft fixed to said rotor at the opposite end and mechanically connecting said rotor to said damping bearing, a cup-shaped tube of electrically-conductive, non-magnetic material in coaxial relationship with said shaft, the open end of said tube extending away from said rotor and the closed end of said tube being directly secured to the adjacent end of the rotor, an annular core of magnetic material fixedly mounted on said support so as to be disposed within said tube and around said shaft, and a second annular magnetic core with coils arranged thereon to receive polyphase current to produce a rotating magnetic field traversing the circumference of said tube, fixedly mounted on said support so as to surround said tube, the size of said first annular core and said second annular core being such as to permit limited radial displacement of said shaft and said tube.

4 Claims, 2 Drawing Figures

INVENTOR.
WILLIAM H. DANCY JR.
BY

GAS CENTRIFUGE WITH DRIVING MOTOR

The present invention relates to gas centrifuges for the separation of isotopes in a gas mixture and, more specifically, to improvements in the driving means for a gas centrifuge to enable economic separation on a production scale.

The basic operation of a gas centrifuge is well known to the prior art. A gas mixture containing a number of isotopes is injected into a long, slender container, generally termed a rotor or bowl, and the rotor is rotated causing the gas to spin and experience a centrifugal force which separates the components of different masses. A number of centrifuge rotors have been designed to improve the quantity of the pure isotope that is recovered and to increase the separation power of the centrifuge. The primary limitation, however, in improving the capabilities of the centrifuge has been the mechanical elements associated with the rotor that prevent the operation of the centrifuge at the high speeds which produce the greatest separating power. One important mechanical problem is the vibration of the rotor as the speed is increased, wherein the rotor passes through a number of critical speeds that produce a substantial radial vibration of the rotor. This vibration must be reduced to a minimum to enable the rotor to pass through the critical speeds without destroying the rotor. (The centrifuge is referred to as operating in a supercritical region after passing through one or more critical speeds.) Damping bearings are usually disposed at either end of the rotor to absorb the vibration at the critical speeds. The bearings tend to reduce the maximum amplitude of vibration and absorb considerable power from the drive means.

These basic problems have dictated the construction of the drive means to a great extent and have resulted in the use of standard motor arrangements that are not completely satisfactory for operating the centrifuge in the regions above the critical speeds. The prior art has employed the gas turbine with the rotor mounted in damping bearings at each end and a flexible member of a rigid shaft which is adequately supported by bearings for coupling the turbine to the rotor. The gas turbine was found to be relatively inefficient and required complex associated apparatus to drive the centrifuge at supercritical speeds. In addition, the coupling arrangement from the drive means to the rotor absorbed considerable energy through the bearings and was not adapted to move with the radial vibration of the rotor other than through the use of a flexible shaft which introduced its own vibrational control problems.

To overcome the problems encountered in the prior art a new type of motor drive was required, if the gas centrifuge was to be capable of producing economical separation of isotopes. The present invention solves a number of the prior art difficulties and brings the goal closer to realization.

It is one object of the present invention to provide a motor drive means for a gas centrifuge that is capable of driving the rotor at the high speeds required for supercritical operation.

It is another object of the present invention to furnish a motor drive for a supercritical gas centrifuge that minimizes the influence of the motor on the mechanical movement of the rotor and substantially eliminates changes in the rotor position due to the magnetic interaction in the motor rotor.

It is a further object of the present invention to provide a motor drive means of small size, high efficiency, and capable of producing the necessary torque for a supercritical gas centrifuge at a reasonable cost.

It is a still further object of the present invention to reduce the number of bearing supports and consequently the power consumed by the mechanical arrangement of the rotor in a supercritical gas centrifuge and at the same time to improve the overall stability of the rotor at high speeds.

It is another object of the present invention to locate the motor rotor adjacent to the rotor and mechanically coupled thereto whereby the problems inherent in the use of an electric drive motor are eliminated and the motor can be designed with an optimum magnetic circuit and materials that increase the efficiency and power of the motor.

It is a still further object of the invention to provide a drive motor for a supercritical gas centrifuge having a motor rotor made from a material which is uniquely suited to maintaining reliable operation at maximum speeds.

The present invention provides a drive means for a supercritical gas centrifuge comprising a tubular rotor and means for introducing a gas mixture into said rotor and the means for removing at least one of the gas components from the rotor. The rotor is supported at each end for rotational movement, one of the support means being a damping bearing to absorb the vibration energy at critical speeds. The drive means includes a tube of electrically conductive material at one end of the rotor in coaxial relationship and mechanically coupled to the rotor for rotational movement therewith. The tube acts as the rotor of a squirrel cage induction motor and a stator assembly surrounds the tube to produce a rotating magnetic field traversing the circumference of the tube. The tube is disposed between the rotor and the bearing support and can be fixed to the bottom of the rotor or to the shaft connecting the rotor and the damping bearing. A core of magnetic material is disposed in the tube and held stationery with respect to the shaft and tube and the stator assembly includes a magnetic core structure and coils arranged to receive a polyphase current to produce the rotating magnetic field. The motor rotor is made from a nonmagnetic material, preferably inconel-x.

The accompanying drawings referred to herein and constituting a part hereof, illustrate one or more embodiments of the present invention and together with the description, serve to explain the principles of the invention.

Figure 1:
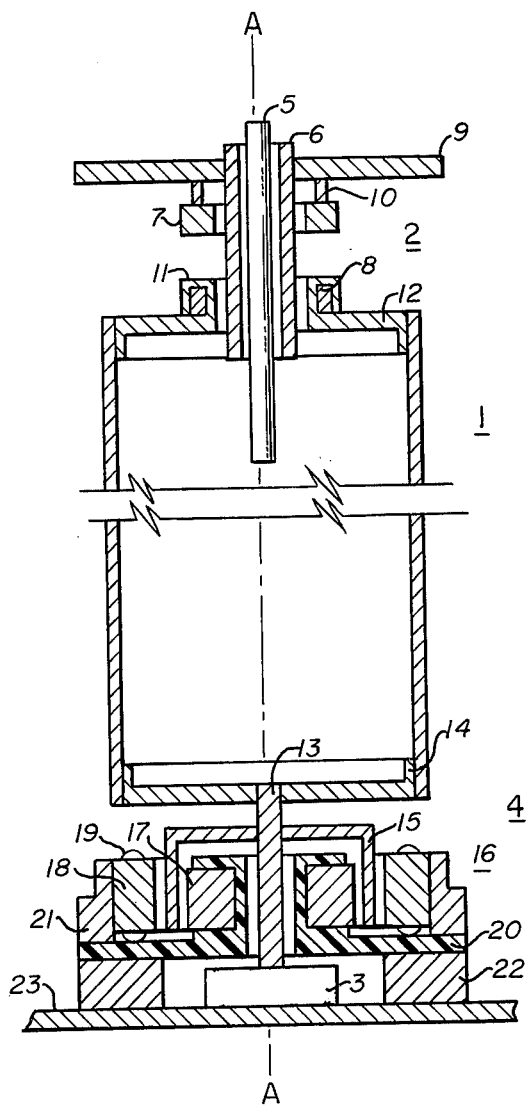
FIG. 1 is a partial cross-sectional view in elevation of a gas centrifuge utilizing the drive means of the present invention.

As shown in FIG. 1, the rotor 1 is mounted between magnetic bearing 2 and damping bearing 3 for rotational movement about the vertical axis A—A. The drive means 4 is disposed at the lower end of the rotor 1, between the damping bearing 3 and the rotor 1. The gas mixture of different masses that is to be separated is introduced into the center of the rotor 1 through tube 5 and a purer concentration of one constituent isotope is withdrawn through tube 6 which is disposed coaxially with respect to tube 5 in the upper end of the rotor 1. Tube 6 is held in place by member 9 and tube 5 can be supported within tube 6 (the support is not shown) so that the rotor 1 freely rotates about tubes 5 and 6. Other types of rotor constructions can be adopted for use in place of the rotor shown in the drawing. One example is the arrangement shown in U.S. application Ser. No. 59,127(1960), filed Sept. 28, 1960. The magnetic bearing 2 which supports the upper end of the rotor comprises pole pieces 7 and 8. Pole piece 7 is suspended from stationery member 9 by flexible straps 10, and pole piece 8 is mounted at the top of the rotor 1 and retained by an end piece 11 on the end cap 12. At the other end of the rotor 1 a shaft 13 extends from end cap 14 to mechanically connect the rotor and the damping bearing 3. The damping bearing 3 can be any one of the conventional designs, such as shown in U.S. Pat. Nos. 2,951,730 or 2,951,731, both issued Sept. 6, 1960, wherein the radial movement of the shaft or the rotor 1 is restricted and the vibration at the critical speeds is substantially absorbed.

The drive motor 4 includes the cup-shaped motor rotor 15 fixed to the shaft 13 for rotational movement therewith and a stator assembly 16 including an inner core 17 of magnetic material and an outer core 18 of magnetic material on which coils 19 are disposed. The inner core 17 is embedded in a plastic material 20 for support within the motor rotor 15 and the stator assembly 16 is held in place by supports 21 and 22, which are in turn supported on member 23. The motor rotor is made from an electrically conductive material and a material also of non-magnetic characteristic, such as inconel-x.

Figure 2:
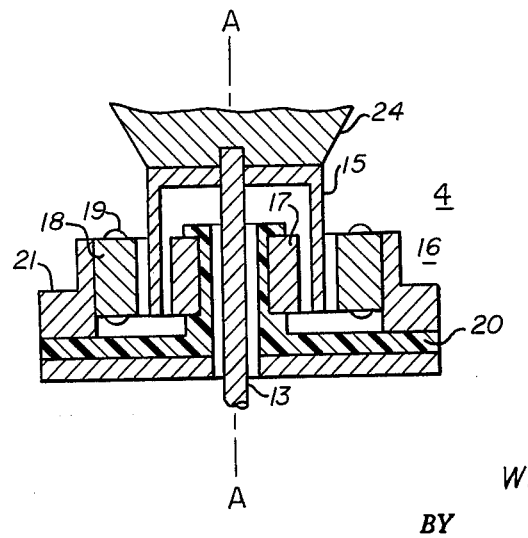
FIG. 2 is another arrangement of the drive means according to the present invention.

In FIG. 2, where the parts that are common to FIG. 1 are represented by the same numbers, the motor rotor is directly attached to the base 24 of the rotor 1 and extends away from the rotor 1 in a coaxial relationship with the shaft 13 and the axis of the rotor 1. The lower end of shaft 13 can be connected to a damping bearing (not shown) as in the arrangement of FIG. 1.

It must be initially mentioned that the rotor 1 has a much greater length-to-diameter ratio than is shown in the schematic arrangement of FIG. 1. The rotor 1 is of considerable length which creates a number of unique problems encountered in the operation of the centrifuge at supercritical speeds. As the speed of the rotor 1 is increased from zero the rotor will reach a critical speed, determined by the mechanical design of the system, at which a radial vibration of the rotor 1 takes place. The damping bearings 2 and 3 permit limited radial movement of the rotor and absorb a large part of the energy of vibration, thereby preventing damage or even shattering of the rotor 1. A number of critical speeds must be passed before the rotor 1 can reach the high speeds that are necessary for optimum separation. A standard electric motor could, in theory, be designed to operate at the high speeds, provided the motor does not introduce other forces which disturb the centrifuge rotor. Optimum damping must be applied to the rotor for successful operation at critical speeds through the use of one or more of the damping bearings and the rotor must be allowed to move in a radial direction in a carefully controlled manner. The radial displacement of the end of the rotor causes a radial displacement of the rotor of any standard electric motor that is directly attached to the rotor and the motor rotor and centrifuge rotor experience a disturbing force of magnetic origin. This force is radially directed in the direction of the initial displacement and is a result of the dissymetry of the magnetic field in the electric motor caused by the displacement. The magnetic field increased in strength on the side of the motor rotor 15 which experiences the decreasing rotor-field piece gap spacing and decreases on the side of the rotor experiencing the increasing gap spacing. All electric motors which have the magnetic rotor material exhibit this characteristic.

The problems encountered with the standard motor and the bearing supports normally associated therewith are substantially eliminated by the present invention through the use of a squirrel cage induction motor 4 positioned at the end of rotor 1. The need for a bearing between the motor 4 and the rotor 1 is eliminated and the motor rotor 15 is especially capable of moving with the radial displacement of the rotor 1 at supercritical speeds without interfering with the operation of the rotor 1. The damping bearing 3 is conveniently disposed at the opposite end of the motor 4 from rotor 1 to support the rotor 1 in a compact and highly stable mechanical system. The arrangement in FIG. 2 applies the motor torque directly to the rotor 1. This improvement enables the rotor to respond more freely to the mechanical nature of the system without deflections introduced from the shaft coupling. Also, a weak link in the mechanical system is strengthened because the torsion and shear on the shaft 13 is eliminated to a great extent. The construction of the motor 4 further aids in the optimum design of the mechanical system by having the motor rotor constructed of a non-magnetic material. The motor rotor 15 moves with the rotor 1 and does not introduce a radial force due to the magnetic inter-action with the stator assembly 16. In addition, the motor 4 is located so that an adequate magnetic circuit can be established in the motor 4 for maximum motor power and efficiency.

The selection of a material suitable for the motor rotor 15 presents a number of problems including the desirability of using a material which is inert in a corrosive atmosphere, is capable of withstanding high yield stresses at elevated temperatures, and is non-magnetic. Materials such as copper and aluminum are not satisfactory and it was found that inconel-x exhibits all of the necessary quantities to permit operation of the gas centrifuge rotor at supercritical speeds.

The invention in its broader aspects is not limited to the specific arrangements as shown and described but is to be defined in terms of the scope of the accompanying claims.

I claim:

1. A centrifuge for separating gaseous constituents of different masses comprising a vertical tubular rotor, means for introducing a gas mixture of different masses into said rotor and means for removing at least one of the gas components from the rotor, a first bearing means supporting said rotor at one end for rotational movement, a support, a damping bearing mounted on said support, a shaft fixed to said rotor at the opposite end and mechanically connecting said rotor to said damping bearing, a cup-shaped tube of electrically conductive, non-magnetic material in coaxial relationship with said shaft, the open end of said tube extending away from said rotor and the closed end of said tube being directly secured to the adjacent end of the rotor, an annular core of magnetic material fixedly mounted on said support so as to be disposed within said tube and around said shaft, and a second annular magnetic core with coils arranged thereon to receive polyphase current to produce a rotating magnetic field traversing the circumference of said tube, fixedly mounted on said support so as to surround said tube, the size of said first annular core and said second annular core being such as to permit limited radial displacement of said shaft and said tube.

2. The apparatus according to claim 1 wherein said cup-shaped tube is made of "Inconel X".

3. A centrifuge for separating gaseous constituents of different masses comprising a vertical tubular rotor, means for introducing a gas mixture of different masses into said rotor and means for removing at least one of the gas components from the rotor, a first bearing means supporting said rotor at one end for rotational movement, a support, a damping bearing mounted on said support, a shaft fixed to said rotor at the opposite end and mechanically connecting said rotor to said damping bearing, a cup-shaped tube of electrically conductive, non-magnetic material in coaxial relationship with said shaft, the open end of said tube extending away from the rotor and the closed end of said tube being directly secured to said shaft, an annular core of magnetic material fixedly mounted on said support so as to be disposed within said tube and around said shaft, and a second annular magnetic core with coils arranged thereon to receive polyphase current to produce a rotating magnetic field traversing the circumference of said tube, fixedly mounted on said support so as to surround said tube, the size of said first annular core and said second annular core being such as to permit limited radial displacement of said shaft and said tube.

4. The apparatus according to claim 3 wherein said cup-shaped tube is made of Inconel X.

* * * * *